Jan. 21, 1969    L. K. DAVIS    3,423,613

ANGULAR STABILIZATION DEVICE

Filed May 6, 1965

INVENTOR.
Louis K. Davis.
BY Henry V. Kaufmann

Jan. 21, 1969   L. K. DAVIS   3,423,613
ANGULAR STABILIZATION DEVICE

Filed May 6, 1965   Sheet 2 of 2

INVENTOR.
BY   Louis K. Davis
Henry W. Kaufmann

United States Patent Office 3,423,613
Patented Jan. 21, 1969

3,423,613
ANGULAR STABILIZATION DEVICE
Louis K. Davis, Audubon, Pa., assignor to General
Electric Company, a corporation of New York
Filed May 6, 1965, Ser. No. 453,762
U.S. Cl. 310—93
Int. Cl. H02k 49/00; H02p 15/00; G01c 19/02
2 Claims

ABSTRACT OF THE DISCLOSURE

Plurality of conventionally driven flywheels are connected by hydraulic circuits through hydraulic turbine housing so that spherical rotor, containing bar magnet to interact with external ambient magnetic field, is rotated in same direction as resultant of all flywheel rotations.

---

This invention pertains to the art of stabilizing space vehicles.

In my copending application for U.S. Patent, Ser. No. 362,216, entitled Motion Damper, I teach the use of a device for damping angular oscillations of a space vehicle with respect to an ambient magnetic field. This is accomplished, in one embodiment, by the provision of damping means for damping relative rotation between an external housing connected to a vehicle to be stabilized, and an inner sphere provided with magnetic means for producing forces between the inner sphere and the ambient magnetic field. It is also known in the prior art to use flywheels, which may be solid or liquid masses capable of being rotated, to absorb undesired angular momentum of a space vehicle in which such flywheels are mounted. This procedure leaves the space vehicle stable, with the undesired angular momentum concentrated in the flywheel. However, the operation of such flywheels ordinarily consumes energy; and there is always a physical limit to the permissible angular velocity which such a flywheel may have. Collisions with particles in space or other causes may, at unpredictable times, impart angular momentum to a vehicle thus equipped; it is therefore desirable that, after each acquisition of an angular momentum by a flywheel, it be divested of such momentum as rapidly as possible, without impairing the stability of the vehicle, in order that it may be ready to absorb more such momentum, at need.

The present invention teaches the construction and use of a device which, while providing damping in the manner of the Motion Damper of my previous invention, also facilitates the unloading of angular momentum by use of forces provided by interaction with the ambient magnetic field.

In one embodiment of my invention the fluid circuits of one or more fluid flywheels are led through nozzles into a spherical housing, similar to the housing of my Motion Damper previously mentioned. Flow of flywheel fluid through such nozzles leads the fluid to circulate around an inner sphere similar to the inner sphere of the Motion Damper. This circulation tends to rotate the inner sphere away from its equilibrium position with respect to the ambient magnetic field. Such displacement from equilibrium produces a torque which may, by proper arrangement of the nozzles with respect to the fluid flywheels they serve, be in the proper direction to absorb angular momentum of the same sign as that stored in the flywheels. By proper design of the housing, nozzles, and inner sphere as a hydraulic turbine, the torque applied to the magnetic means which couples with the ambient field may be kept below the "breakaway" torque at which the magnetic means permits complete rotation with respect to the field. This is desirable for ordinary operation. However, it can be shown in general that, even if a semicatastrophic event should cause the vehicle or the inner sphere alone to begin tumbling in complete rotation, the operation of stabilizing devices according to the present invention will ultimately unload angular momentum and terminate rotation.

Thus it is a general object of my invention to provide for the unloading of stored angular momentum against torque provided by interaction with an external force field. Detailed or specific objects achieved in the accomplishment of the general object may be multiplied according to the ingenuity used in their recital; but worthy of specific mention are the following: to unload the angular momentum of circulating fluid masses by hydraulic interaction with a freely rotatable member restrained by interaction with an external force field; to thus unload angular momentum by a device which is also capable of providing viscous damping of oscillations; to accomplish any of these objects in the specific case that the external force field is a magnetic field. Additional generally desirable other objects, such as the achievement of simplicity, reliability, compactness, and flexibility of application, will be clear to those skilled in the art from my disclosure herein.

For the better understanding and explanation of my invention, I have provided figures of drawing, in which FIG. 1 represents schematically in partial cut-away an arrangement of nozzles in a housing for application in the practice of my invention;

Figure 1:
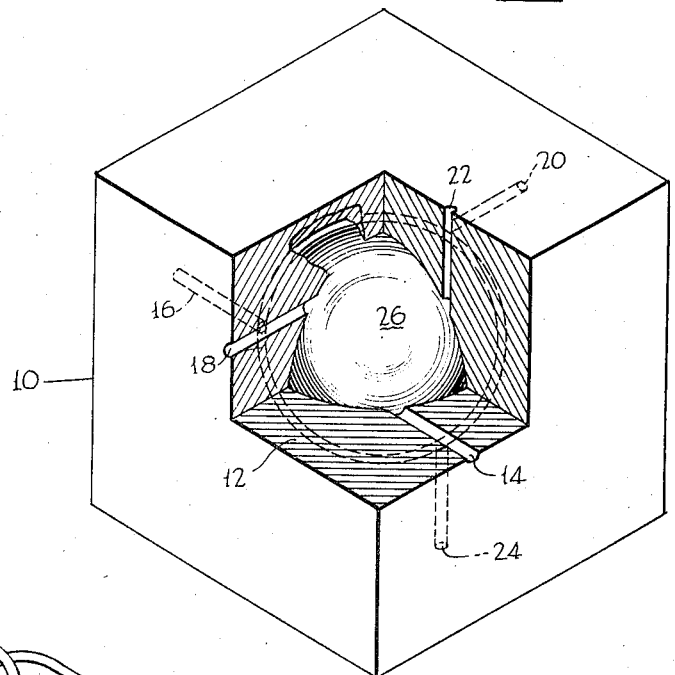

Referring to FIG. 1, there is represented isometrically a housing 10, partly cut away, having in it a central spherical hole 12 to which there lead three pairs of ports or nozzles, as follows: Ports 14 and 16 are collinear, emerging on opposite sides of housing 10, 16 being shown by dashed lines because it is in fact concealed by housing 10; ports 18 and 20 are collinear, emerging on another pair of opposite sides of housing 10, port 20 being indicated by dashed lines because housing 10 conceals it; and posts 22 and 24 are collinear, emerging on a third pair of opposite sides of housing 10, port 24 being represented by dashed lines because it is invisible within housing 10, in this projection. The three pairs (14, 16; 18, 20; and 22, 24) of ports are mutually orthogonal; and their axes all pass clear of the center of hole 12. Thus a sphere or rotor 26 (to be described in connection with FIG. 3) located in hole 12 and free to rotate therein will be driven to rotate as follows by fluid flow through the various pairs of ports: Flow in at port 14 and out at port 16 will tend to rotate such a sphere 26 around a vertical axis parallel to the axis of ports 22 and 24, clockwise as viewed from the outer entrance to port 22. Flow in at port 18 and out at port 20 will tend to rotate sphere 26 around a horizontal axis parallel to the axis of ports 14 and 16, clockwise as viewed from the outer entrance to port 14. Flow in at port 22 and out at port 24 will tend to rotate sphere 26 around a horizontal axis parallel to the common axis of ports 18 and 20, clockwise as viewed from the outer entrance to port 18. Reversal of the direction of any of the specified flows will, of course, reverse the indicated direction of rotation. It is evident that simultaneous occurrence of any of the flows recited will result in a rotation having components of rotation around the axes described. As will be described hereinafter, the housing 10 should preferably be at least partly of diamagnetic material; and, obviously, it can receive an internal sphere 26 only if it is actually a split structure whose separate parts are held together by some means such as a conventional flange and bolt arrangement. However, the necessity for showing clearly the relative positions of the various ports, even numbered 14 through 24, renders it desirable to show housing 10 unencumbered by fastening means or marks of separation of various parts. Similarly, the outer shape of housing 10 may, as a practical matter, be approximately spherical; but its representation as a cube greatly facilitates description of the relative positions of the three pairs of collinear nozzles or ports and of the axes about which flow through them will tend to produce rotation of an inner rotatable sphere 26.

Figure 2:
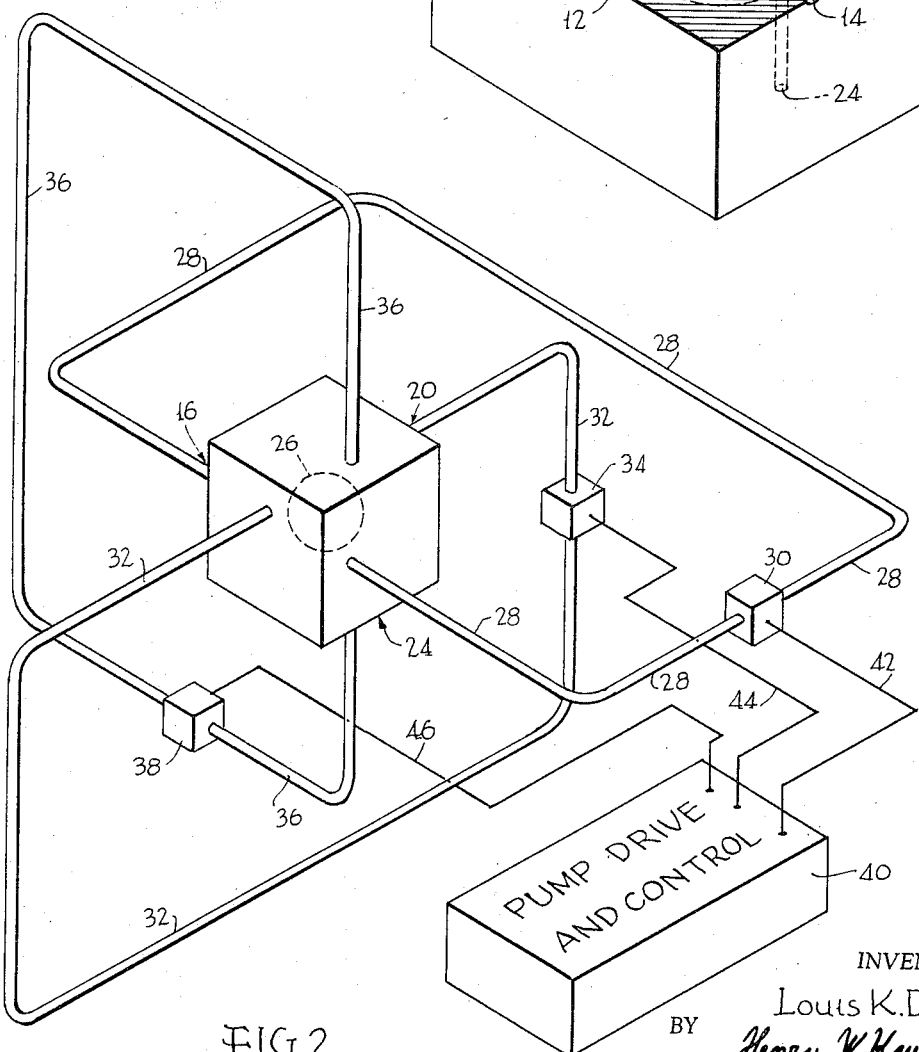
FIG. 2 represents schematically a system in which a plurality of fluid flywheels are connected to a magnetically anchored damper encased in a housing provided with nozzles in the manner indicated in FIG. 1.

FIG. 2 represents schematically, in isometric representation, three fluid flywheels connected with individual hydraulic pumps, with the hydraulic circuit of each fluid flywheel running through a pair of coaxial ports or nozzles as represented in FIG. 1. Specifically, housing 10 is represented in the same orientation as in FIG. 1. Connected to ports 14 and 16 is a fluid flywheel 28 oriented so that, when fluid flow occurs in it, it has angular momentum around an axis parallel to the axis of nozzles 22 and 24. (The term "fluid flywheel" is here used, conventionally, to refer to the combination of conduit and massive fluid capable of flowing therein; obviously, what is actually visibly represented here is the conduit, just as an external view of a pipe full of water will actually represent only the pipe.) A pump for driving the flywheel (more specifically, driving the fluid through the conduit) is represented by a cube 30. Conventionally, such a pump may be a magnetohydrodynamic pump in which electric current is passed through the fluid, at right angles to a magnetic field, both the current flow and the magnetic field being orthogonal to the direction in which the fluid is driven. Similarly, fluid flywheel 32 is connected to ports or nozzles 18 and 20, and is so oriented that it can have angular momentum around an axis parallel to the axis of nozzles 14 and 16, when pump 34 is operated. Likewise, fluid flywheel 36 is connected to ports 22 and 24, and will have angular momentum around axis parallel to the axis of ports 18 and 20, when pump 38 is operated. Since my invention is not confined to the use of any particular scheme of drive or control for the flywheels, there is represented a rectangle 40, marked "Pump Drive and Control," to which pumps 30, 34, and 38 are connected by channels 42, 44, and 46, respectively. These channels will, in the simple case that magnetohydrodynamic pumps with permanent magnets are employed, be simple pairs of electrical conductors; but, since the particular nature of the pump or drive is immaterial to my invention, they are represented simply as single lines. More detailed information concerning fluid flywheels and their use may be found in United States Patent No. 2,856,142 of Haviland, to which attention is invited.

Figure 3:
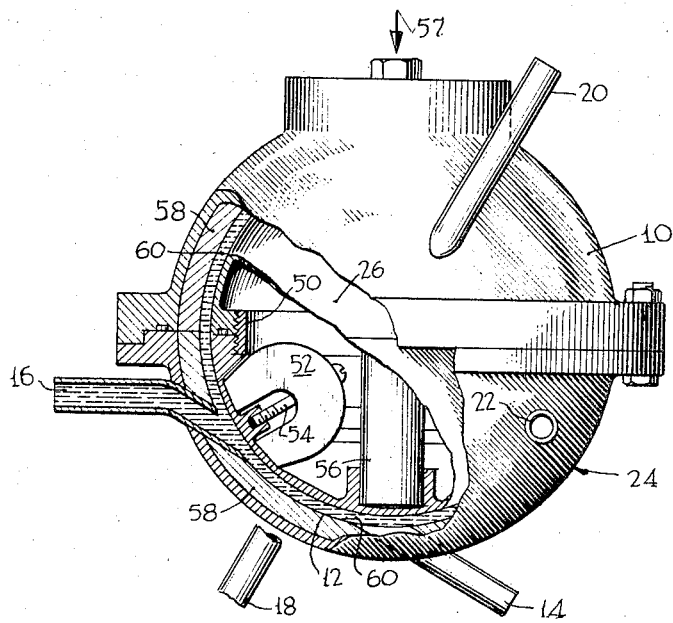
FIG. 3 represents schematically, partly in section, details of a rotor and housing suitable for incorporation in the embodiment of FIG. 2.

FIG. 3 represents, partly in section and cut-away, a more specific embodiment of the structure represented in FIG. 1. The sphere 26 is actually composed of two hemispheres of some nonmagnetic material, which may conveniently be an aluminum alloy. The two hemispheres are joined to form an externally smooth sphere by a threaded spider or hub 50 which engages female threads in the interiors of the hemispheres. Inside the sphere thus formed are a plurality of horseshoe magnets, of which only 52 is visible, held by a screw 54 so that its poles rest against the inner surface of sphere 26. A permanent bar magnet 56 extends between poles of the sphere 26, producing an external field which is appreciable at a distance from the sphere 20, even outside the housing 10. Thus, the field of magnet 56 can interact with the ambient magnetic field 57, e.g., of the earth, and provide anchoring for the sphere 26 against torques tending to rotate it. The beneficial effects of such anchoring are explained in more detail in my copending application Ser. No. 362,216, to which reference has already been made. Briefly, they may be described as a method of transferring angular momentum to the earth via the torque exerted on the earth's magnetic dipole. Horseshoe magnet 52 is of such shape that it produces a very intense field in the immediate vicinity of its poles, but only a negligible field at a distance from sphere 26. However, this intense field interacts with diamagnetic liner 58, which may conveniently be made of two hemispheres of bismuth, to produce repulsion between liner 58 and magnet 52. A plurality of horseshoe magnets similar to 52, but not visible because concealed by the housing 10 and its liner 58, is located symmetrically around the interior of sphere 26. Thus there exists a plurality of repulsive forces between the liner 58 and the plurality of horseshoe magnets. Because of the symmetry of the spherical liner 58 and of the arrangement of the plurality of horseshoe magnets similar to and including 52, the resultant of all these repulsive forces will be zero when sphere 26 is located centrally within liner 58; but if sphere 26 is displaced from such central location, the repulsive forces upon the various magnets will be so altered as to produce a resultant force tending to restore sphere 26 to its central position. Thus, in a sufficiently small gravitational field, sphere 26 will be maintained free to rotate within liner 58.

Ports 14, 16, 20, and 22 are represented in FIG. 3; but the cutting away necessary to permit view of the interior of the assembly results in the cutting away of part of port or nozzle 18; and port or nozzle 24 is concealed by other structure. However, it will be recognized that they all have, in the representation of FIG. 3, the same orthogonal or collinear relationships described in connection with FIG. 1. They all extend through housing 10 and liner 58 to connect with the inner cavity 12, which is represented as containing a fluid 60, which is circulated in the flywheel conduits and if magnetohydrodynamic pumps are employed, may conveniently be mercury. Since details of mechanical structure of housings similar to 10 are given in my copending application S.N. 362,216, and are within the ordinary knowledge of the skilled art, they will not be repeated here.

It will be evident upon comparison of FIG. 1 with FIG. 3 that the detailed embodiment represented by FIG. 3 has, in fact, the operative characteristics described as pertaining to FIG. 1.

Returning to consideration of FIG. 2, let it be assumed that, as a result of acquisition of angular momentum by the vehicle in which the embodiment of FIG. 2 is installed, equilibrium of the vehicle has been achieved by action of the pump drive and control 40 in causing circulation of fluid through conduit 36 in such a direction as to cause fluid to enter at port 22 and leave from port 24 to re-enter conduit 36. There will then be stored in the circulating fluid angular momentum around an axis parallel to the axis of ports 18 and 20, and clockwise as viewed from port 18. Consideration of the simplified representation of FIG. 1 will reveal that fluid flow from port 22 to port 24 will tend to cause sphere 26 to rotate about an axis parallel to the axis of ports 18 and 22, clockwise as viewed from port 18. Such rotation will tend to be restrained by interaction between bar magnet 56 and the external ambient magnetic field (represented, for completeness, by the arrow 57 in FIG. 3). Actually, the slight rotation of sphere 26 will cause bar magnet 56 to rotate slightly out of line with field 62, producing a slight restraining torque on sphere 26. Since sphere 26 is coupled to the flywheel fluid by viscous interaction, there will result a gradual deceleration of the fluid with transfer of its angular momentum to the mass which is the source of ambient field 62—e.g., the earth. Thus it is apparent that, for the particular case illustrated, angular momentum stored in the flywheel fluid 60 will be dissipated through the action of the device of FIGS. 1 and 3. It may be seen that, if angular momentum is stored in more than one of the fluid flywheels 28, 32, and 36, sphere 26 will undergo a rotation having components around more than one axis, and bar magnet 56 will interact with the ambient field 57 to develop moments around more than one axis. Consequently, the angular momentum stored in all the fluid flywheels will be dissipated.

It should be pointed out that the direction of the ambient magnetic field with respect to a satellite may change gradually as the vehicle progresses in its orbit, e.g. around the earth. However, because the constraints upon the rotation of sphere 26 are free of static friction and composed only of dynamic friction, which is small at low speeds, the sphere 26 is free to rotate very slowly to maintain magnet 56 aligned with the slowly rotating ambient field 62 without applying large disturbing torques to the vehicle. And yet the comparatively rapid movement of fluid 60 through the housing 10 will cause sphere 26 to rotate out of alignment with the external ambient field 62 to produce the torques described.

In general, the use of a conductive fluid (which is required by magnetohydrodynamic pumps) is conveniently effected by the use of mercury, whose high density minimizes the volume of fluid required. However, if the use of mercury is objectionable, nonconductive fluids may be employed by the use of conventional reversible mechanical pumps. (Metal parts in contact with mercury may require a protective film, e.g. lacquer, to prevent amalgamation.)

It is possible to avoid the use of fluid flywheels entirely, if desired, by applying conventional rigid flywheels having hydraulic pumps connected to them so that rotation of a flywheel causes flow of fluid around sphere 26. Such an embodiment is represented schematically by FIG. 4.

Here the embodiment represented ideally by FIG. 1, and in more detail by FIG. 3, is represented with the reference numbers previously used. There are further represented a flywheel 64 driven by a motor 66, a flywheel 68 driven by a motor 70, and a flywheel 72 driven by a motor 74. The axes of these three flywheel-motor combinations are mutually perpendicular to each other. In the numbering of certain other elements to be described which bear a cognate relationship, but not identity, with elements described in connection with FIG. 2, this cognate relation has been emphasized by using reference numbers one hundred higher than the reference numbers assigned to the cognate items. Thus, for example, motor drive and control is a cognate of pump drive and control 40; so motor drive and control (which is represented as connected by separate channels to motors 66, 70, and 74) is numbered 140. On the respective shafts of flywheel-motor combinations 64–66, 68–70, and 72–74 there are represented pumps 130, 134, and 138. These pumps are not used to provide the primary drive for the flywheels; their function is to cause a circulation of fluid through the respective pairs of ports in housing 10, and thus around sphere 26, when their associated flywheels rotate. Thus pump 130 is represented connected to ports 14 and 16; pump 134 is represented connected to ports 18 and 20; and pump 138 is represented connected to ports 22 and 24. These pumps are reversible, i.e. the direction in which they cause fluid to flow is reversed when their direction of rotation is reversed. Curved arrows drawn around flywheels 64, 68, and 70 indicated assumed directions of rotation; straight arrows drawn parallel to the conduits leading from pumps 130, 134, and 138 indicate the direction of fluid flow resulting from such rotation. It should be noted that the conduits connecting the pumps with the ports are not intended to constitute fluid flywheels; the mass of fluid in them is not intended to acquire any appreciable angular momentum; the sole purpose of the pumps 130, 134, and 138 and the conduits connecting them to the ports of housing 10 is to cause rotation of the rigid flywheels 64, 68, and 72 to produce around sphere 26 the same fluid flow which occurs in the embodiment of FIG. 2 when angular momentum of the same orientation is stored by fluid flywheels. The resulting displacement of sphere 26, and consequent interaction of bar magnet 56 with the ambient field 62 will be the same.

Figure 4:
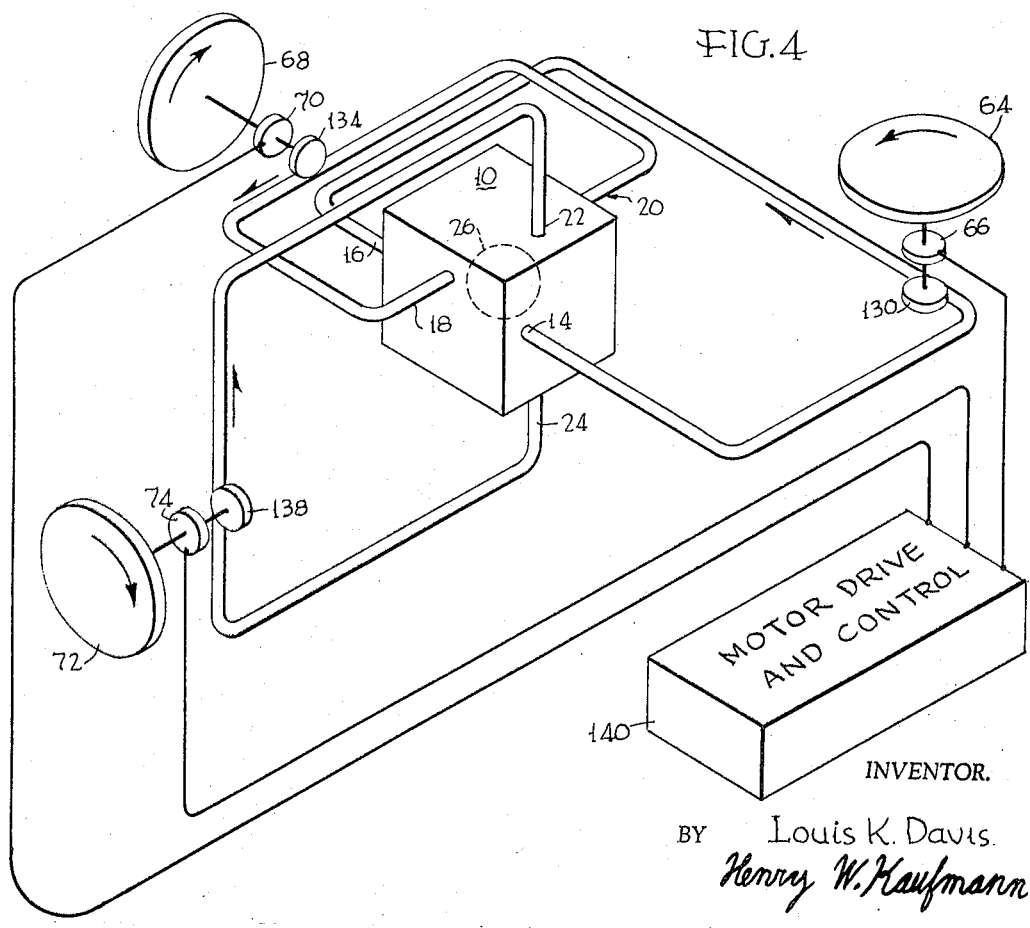
FIG. 4 represents an alternate, generally non-preferred, embodiment of my invention in which non-fluid flywheels are connected by shafts to hydraulic pumps which drive fluid through a housing containing a rotor as represented in FIG. 3.

It should be observed that damping of relative motion occurring between sphere 26 and liner 58 will contribute to damping oscillations of the vehicle in which the embodiment of either FIG. 2 or of FIG. 4 is mounted. Such action is more fully disclosed in my copending application Ser. No. 362,216.

Subdivision of the appended claims into subparagraphs is purely for ease in reading and is not necessarily indicative of any necessary relationship or relative importance of the recitals therein.

What is claimed is:

1. A device for unloading angular momentum against the constraint of an external magnetic field, comprising:
   a sphere of non-magnetic material containing
      a bar magnet extending between opposite poles of the said sphere
      a plurality of horseshoe magnets located symmetrically about the center of the said sphere with their poles near the surface of the said sphere;
   a housing having
      an internal spherical cavity larger than and containing the said sphere;
      an inner portion, surrounding the said spherical cavity, of diamagnetic material;
      at least three pairs of ports,
         each pair of ports being substantially collinear along an axis which passes away from the center of the said spherical cavity;
         the axes along which the said pairs of ports are substantially collinear being at right angles to each other;
   three fluid flywheels for storage of angular momentum around three axes parallel to the axes along which the said pairs of ports are substantially collinear and connected each one to a different pair of ports to permit flow of the fluid of the said fluid flywheels in the said internal cavity to rotate the said sphere around axes parallel to the axes around which the said angular momentum is stored.

2. A device for unloading angular momentum against the constraint of an external ambient magnetic field, comprising
   means for storing angular momentum by the rotation of mass;
   a source of magnetic field to produce external to the said device a magnetic field effective to interact with an ambient external magnetic field;
   means responsive to the said rotation of mass for rotating the said source of magnetic field in the same direction as the direction of the said rotation of mass.

References Cited
UNITED STATES PATENTS

| | | | |
|---|---|---|---|
| 2,622,707 | 12/1952 | Faus | 310—93 |
| 3,033,045 | 5/1962 | Taylor | 74—5.4 |
| 3,114,518 | 12/1963 | Fischell | 310—93 |
| 3,252,340 | 5/1966 | Watt | 74—5.46 |

ROBERT K. SCHAFER, *Primary Examiner.*

H. O. JONES, *Assistant Examiner.*

U.S. Cl. X.R.

74—5